UNITED STATES PATENT OFFICE.

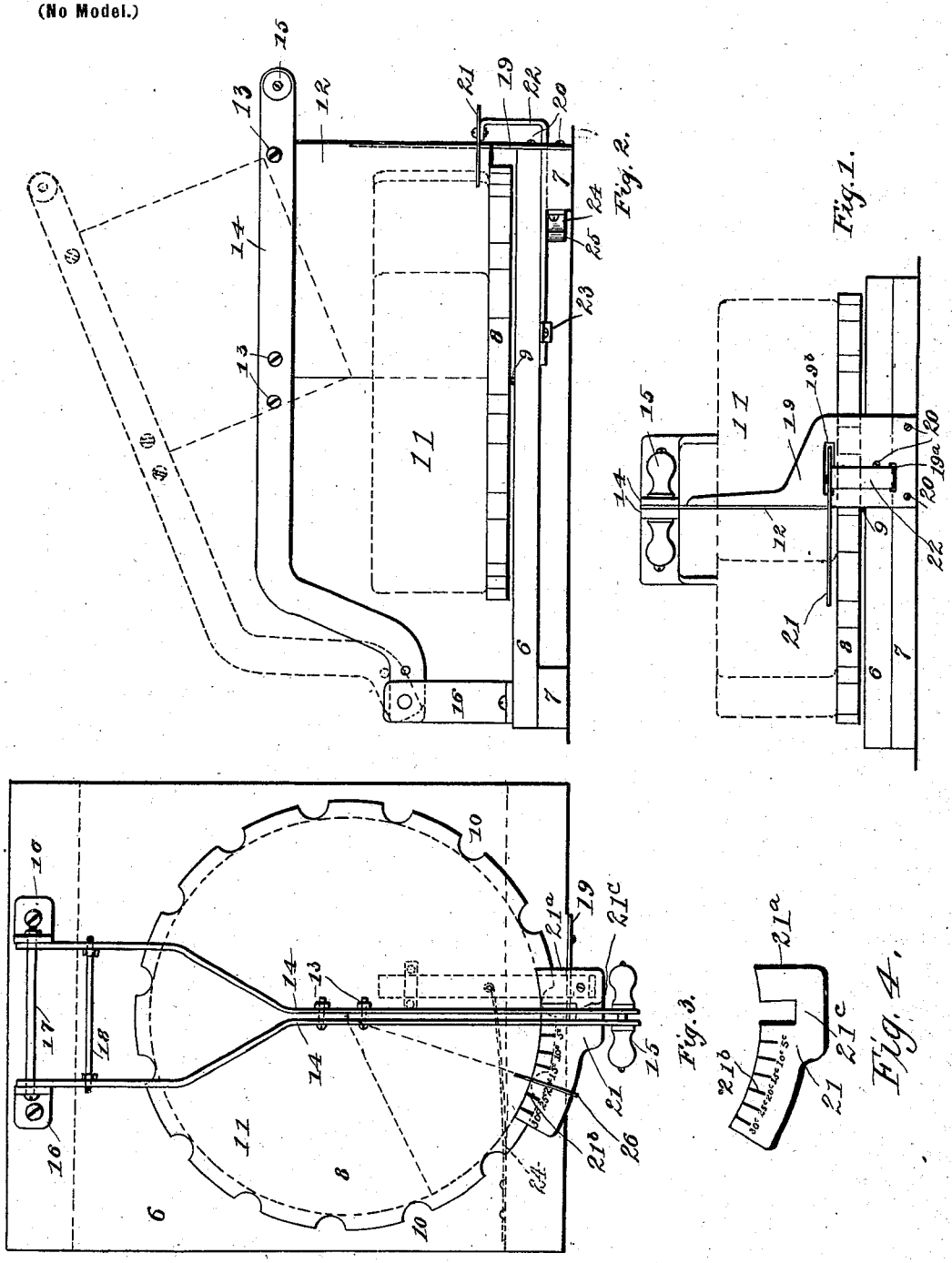

EMIL NIGGLI, OF SAN ANTONIO, TEXAS.

CHEESE-CUTTER.

SPECIFICATION forming part of Letters Patent No. 701,924, dated June 10, 1902.

Application filed September 9, 1901. Serial No. 74,770. (No model.)

*To all whom it may concern:*

Be it known that I, EMIL NIGGLI, a citizen of the United States, residing at San Antonio, in the county of Bexar and State of Texas, have invented certain new and useful Improvements in Cheese-Cutters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to cheese-cutters, and particularly to cutters having a scale to indicate the amount of cheese to be cut.

The object of the invention is to provide a cutter which will cut a predetermined quantity of cheese.

A further object is to construct a cutter with a scale-plate adapted to bear against the side of cheeses of different sizes, so that its use will not be limited to cheese of one particular size.

Referring to the drawings, Figure 1 is a front elevation of the cutter. Fig. 2 is a side elevation thereof, and Fig. 3 is a top plan view. Fig. 4 is a plan view of the scale-plate.

Referring particularly to the drawings, a stationary platform 6, preferably rectangular, is secured to blocks 7, and a circular platform 8 is mounted thereon to rotate upon the pivot 9. The outer edge of the platform 8 has finger-notches 10 to facilitate rotation. The cheese to be cut is carried upon this platform and is indicated in dotted lines at 11.

The blade 12 is firmly secured, as by bolts 13, between the knife-bars 14, which are provided at their front end with a handle 15, whereby the knife is raised and lowered. To avoid lateral play, the rear ends of the knife-bars are spread, as shown, giving a wide bearing between the brackets 16, to which they are pivoted by a bolt 17. The brackets are bolted or otherwise secured to the stationary platform. An expanding bolt 18 between the bars serves to cause the bars to bind at the pivot sufficiently to counteract the weight of the knife, so that when raised it will remain so without holding.

The knife-guide 19 is secured to the block 7 by screws 20 or otherwise and extends upwardly, its edge forming a guide for the descending blade. The scale-plate 21 is supported in a position to contact with the side of the cheese upon a bar 22. This bar is secured loosely to the bottom of the platform 6 by a strap 23 and extends thence outwardly beyond the edge of said platform, where it is bent upwardly at substantially a right angle and is bolted at its upper end to the scale-plate. The bar and plate are movable radially relative to the cheese, so as to accommodate cheeses of different sizes. A flat spring 24 is secured at one end to a pin 25, projecting from the lower side of the bar, and at the other end to the block 7 and tends to retain the edge of the plate in contact with the side of the cheese. The knife-guide is slotted, as at 19ª, to permit the passage therethrough of the bar 22, and is also slotted, as at 19ᵇ, for the extension 21ª of the scale-plate. This extension is on the opposite side of the blade from the scale, so that it bears against the stock of the cheese after the cut is removed, thereby retaining the plate in alinement with the periphery of the cheese.

The scale-plate is provided with a scale 21ᵇ and with a removable gage piece or index 26, (shown only in Fig. 3,) the inner end of which projects within the periphery of the cheese. In operation the index is placed on the scale at the point desired and the cheese turned until its cut face contacts therewith, when the knife can be lowered and the desired cut made. Different-sized scale-plates may be used, containing scales of different gradations to suit cheeses of different prices or thicknesses. The plate 21 and its extension 21ª are joined at the outer edge by a neck 21ᶜ of less width than the said plate and extension, (see Fig. 3,) so that a recess or slot is formed extending into the plate from the inner edge thereof, through which recess the outer edge of the blade 12 passes. This recess is of such length that the blade will not strike the neck 21ᶜ in cutting any cheese within the intended use of the cutter.

Having thus described the invention, what is claimed as new, and desired to be secured by Letters Patent, is—

1. In a cheese-cutter, the combination with a rotatable platform and a knife, of a radially-movable scale-plate bearing against the cheese on one side of the knife, and an extension of the scale-plate bearing against the cheese on the other side of the knife.

2. In a cheese-cutter, in combination, a stationary platform having brackets thereon, a rotatable platform thereon, knife-bars pivoted upon said brackets, a blade attached to the knife-bars, and an expanding bolt between the knife-bars adapted to cause them to bind at the pivot, against said brackets.

3. In a cheese-cutter, in combination, a stationary platform, a rotatable platform thereon, a yielding radially-slidable bar supported on the stationary platform, a scale-plate carried by the bar and adapted to bear against the side of the cheese, and a knife pivoted to the stationary platform.

In testimony whereof I affix my signature in presence of two witnesses.

EMIL NIGGLI.

Witnesses:
GUS F. NIGGLI,
CHAS. WUESTE.